Figure 1:
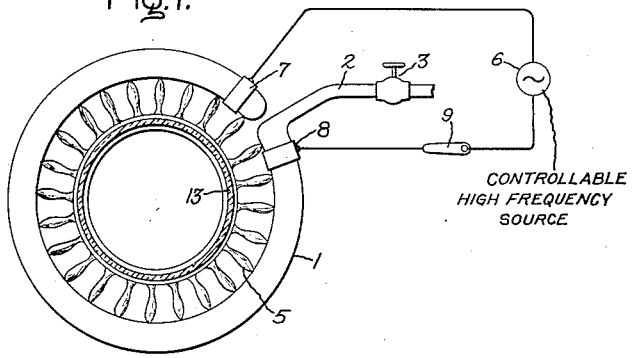

Sept. 24, 1946.    O. W. PIKE    2,408,339

HEATING APPARATUS

Filed Jan. 28, 1943

CONTROLLABLE
HIGH FREQUENCY
SOURCE

Inventor:
Otis W. Pike,
by Harry E. Dunham
His Attorney.

Patented Sept. 24, 1946

2,408,339

UNITED STATES PATENT OFFICE 2,408,339

HEATING APPARATUS

Otis W. Pike, Schenectady, N. Y., assignor to General Electric Company, a corporation of New York Application January 28, 1943, Serial No. 473,845

11 Claims. (Cl. 263—4)

My invention relates to heating apparatus and more particularly to heating apparatus to be used in making glass-to-metal seals.

As is well appreciated, in making hermetic seals, and in particular those seals involving the joining of glass and metal parts, it is important to employ materials having similar or correlated temperature coefficients of expansion with respect to the joined parts, so that upon cooling of the parts after the sealing operation the parts are not subjected to inordinate mechanical strains thereby rupturing the seal. Furthermore, in the manufacturing process of such seals, it is important to obtain uniform heating of the parts to be joined or sealed in order that the expansion of the parts be uniform.

In accordance with the teachings of my invention described hereinafter, I provide new and improved apparatus for sealing parts, such as vitreous and metal parts, and wherein the apparatus provides a more nearly uniform heat treatment of the parts so that there is no tendency to establish inordinate mechanical strains in the sealing operation or in the cooling operation thereafter.

It is an object of my invention to provide new and improved apparatus for the heat treatment of glass or metal parts.

It is another object of my invention to provide new and improved apparatus and methods for heating glass or metal parts to be joined or sealed.

It is a further object of my invention to provide new and improved heating apparatus for sealing glass to metal which comprises an annular metallic tube which surrounds the parts to be joined, and which is provided with a single annular opening or a plurality of circumferentially spaced openings or orifices through which a combustible fluid, such as a gas, is ejected in a combustible condition against one of the parts, or the parts, and in which further heat treatment of the parts is obtained by transmitting high frequency current through the annular tube.

It is a still further object of my invention to provide new and improved apparatus for the heat treatment of metals or vitreous materials and which comprises the employment of a metallic tubing which not only conducts and orients jets of a combustible fluid, but also transmits high frequency alternating current to produce an additional heating effect of the materials, the tube being of such configuration and size so that it contains the fluid in a sufficient quantity to effect appreciable cooling or limitation in the temperature of the tube by the absorption of heat therefrom.

Briefly stated, in the illustrated embodiment of my invention I provide new and improved apparatus for the heat treatment of glass or metal parts, with particular reference to the heat treatment of metals and vitreous materials which are to be hermetically sealed. One instance of the type of sealing operation to which the apparatus described may be applied, is that relating to the manufacture of electric discharge devices or lamps wherein in many cases it is desired to form hermetic and mechanically strong seals between metals and vitreous parts. More specifically, I provide a metallic tube which may have an annular configuration and which is adapted to carry a combustible fluid, such as a gas, and is provided with a plurality of circumferentially spaced openings, or orifices, through which the gas is ejected in a combustible condition against the part, or parts, undergoing heat treatment. In addition, the metallic tube conducts high frequency alternating current which produces an additional heating effect by electromagnetic induction.

Figure 2:
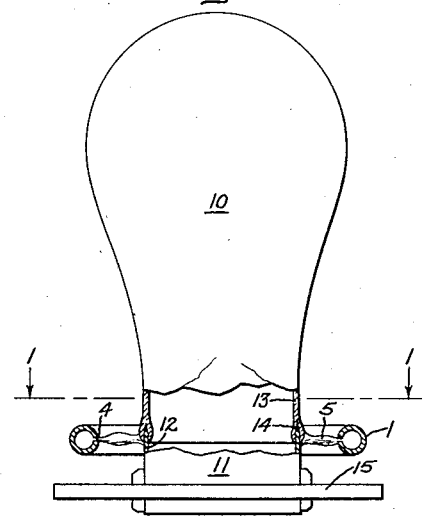

For a better understanding of my invention, reference may be had to the following description taken in connection with the accompanying drawing, and its scope will be pointed out in the appended claims. Figs. 1 and 2 illustrate one manner in which my invention may be applied to the glass and metal parts which constitute a glass-to-metal seal of an electric discharge device or lamp; Fig. 1 is a plan view of the heating structure comprising an annular tube, and Fig. 2 is an elevational view showing the tube in cross section and the glass-to-metal parts constituting a seal of an electric discharge device in spaced relation to the tube.

Referring now to Fig. 1, my invention is there illustrated as applied to an arrangement for heating glass and metal parts which are to form a seal constituting a part of an electric discharge device or lamp shown in elevational view in Fig. 2. I provide a metallic conduit or tube 1 which may have an annular configuration and which is supplied with a combustible fluid or gas through a conduit 2. The quantity of the fluid or gas may be controlled by a suitable means such as a valve 3. At one end the tube 1 is closed, and the tube is arranged to carry a sufficient quantity of the fluid or gas so that the gas serves to limit the temperature of the tube which may be heated to a considerable extent by the high frequency current. Furthermore, the amount of the fluid or gas contained in the tube 1 may be such that the tube operates in effect as a manifold or reservoir to assure and maintain an adequate and substantially constant pressure, so that uniform heating is obtained of the glass and metal parts to be joined. The manifold is arranged to eject an annular flame or series of flames to obtain uniform annular heating of the glass and metal parts. In one modification of my invention, the manifold or reservoir comprising tube 1 may be provided with a plurality of circumferentially spaced openings or orifices 4 which face the parts undergoing treatment and which are shown in Fig. 2. The orifices may be uniformly placed about the inner periphery of tube 1, or may assume any suitable configuration correlated with respect to the parts to be subjected to the heat treatment. It will be understood that in a limiting case the orifices may merge into a single annular opening or slot facing the parts to be joined.

The gas which is conducted through tube 1 is preferably in combustible condition and, after ignition, produces a plurality of circumferentially spaced flames 5 which impinge upon the metal or vitreous parts undergoing treatment. If desired, the fluid or gas may be such that it becomes a combustible mixture after leaving the orifice, or orifices, of tube 1.

I also provide high frequency alternating current for producing an additional heating effect, and the high frequency current is conducted or transmitted by the metal tube 1. High frequency current may be supplied to the tube 1 by means of a suitable controllable high frequency generator 6 which is connected to tube 1 by means of annular straps 7 and 8. The application of heating current to tube 1 may be controlled by suitable circuit controlling means such as a switch 9.

The output of the high frequency source 6 is controllable; that is, the magnitude of the current supplied thereby is controllable thereby providing in conjunction with the thermal heating means comprising the jets or flames 5, an arrangement for selectively controlling the temperatures of the glass and metal parts. The source of high frequency 6 may be controlled so that the metal parts are heated first, or to a greater extent, by the inductive heating effect and the glass parts are heated secondarily. In this manner, by a combination of the high frequency inductive heating and the flames, the glass and metal parts may be brought to the optimum temperatures at any chosen time during the heating process.

In Fig. 2, which is an elevational view in partial cross-section, the heating structure shown in Fig. 1 serves to direct the flames 5 against the metal and vitreous parts constituting a hermetic seal for an electric discharge device or lamp 10 having a base part 11 provided with an annular metallic base part 12 to which it is desired to seal a glass envelope 13. The metal part 12 is tapered at its uppermost rim 14 so that upon application of heat to the envelope 13, the annular base part 12 is projected into the glass or vitreous envelope while it is in a deformable condition. Base 11 is supported from a mount and clamping arrangement 15, and by the relative vertical movement between the envelope 11 and the mount 15, the above described insertion of part 12 into the glass is effected. Of course, the envelope 10 may be held in the desired position by apparatus not shown. As will be readily appreciated by those skilled in the art, the holding mount 15 may be rotated so that the glass and metal parts are uniformly exposed to the gas flames 5.

Although in the above described embodiment of my invention I have chosen to represent my invention as applied to the heating of a tapered type seal, it will be apparent that my invention may be applied with equal facility to other types of seals such as butt-type seals.

My invention lends itself with great facility to the heat treatment of arrangements where it is desired to obtain an hermetical juncture between glass and metal parts, and is particularly adaptable to those arrangements where specific alloys, such as alloys of iron, nickel, or cobalt, or the like, are used for sealing glass to metal parts. By virtue of the uniform production of heat by the combustion of the gas and the uniform disposition of the high frequency field, the advantage of using particularly adaptable alloys for this purpose is more fully realized since the temperature gradients around the periphery of the glass and metal parts are reduced to a minimum, thereby reducing or substantially eliminating variations in expansion of the parts and consequently effecting a more uniform juncture of the metal and vitreous materials.

A further important advantage of apparatus built in accordance with my invention is the method of heating the glass and metal parts, and more particularly the facility afforded thereby which permits relative control of the glass and metal part temperatures. The heating effect due to the high frequency current may be employed to heat the metal parts first or to raise the temperature of the metal parts at a higher or greater rate than the glass parts, thereby establishing the optimum temperatures to obtain a desired seal. When a terminal means such as a gas jet is employed alone, it is difficult in many instances to heat the metal parts sufficiently before the temperature of the glass parts is raised to that value at which it is desired to make the seal. By the use of the combination of inductive heating and the thermal or gas jet heating arrangement, each of the parts undergoing the heat treatment may be brought to the desired or optimum temperature at the desired time.

While I have shown and described my invention as applied to a particular arrangement for forming a seal constituting a part of an electric discharge device or lamp, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In apparatus for heating glass parts or the like, the combination which comprises means for heating said parts including a metallic tube shaped to surround substantially said parts, means for supplying combustible gas to said tube, an opening in said tube through which said gas may be directed in burning condition against the parts under treatment, and means for passing high frequency current through the tube to produce further heating of the parts by the action of said high frequency current.

2. In apparatus for sealing glass and metal parts to be joined, the combination comprising a burner including a metallic tube adapted to carry a combustible fluid, an opening in said tube through which said fluid may be directed in burning condition against the parts under treatment, and means for passing high frequency current through the tube to produce further heating of the parts by the action of said high frequency current, said burner being predominately effective to raise the temperature of the glass part and said high frequency current being predominately effective to heat said metal part and means for establishing the relative heating effects of said burner and said high frequency current to control the relative temperatures of said glass and metal parts.

3. In apparatus for sealing glass and metal parts, the combination comprising a burner including a metallic tube shaped to surround substantially said parts and adapted to carry a combustible fluid, openings in said tube through which said fluid may be directed in burning condition against the glass and metal parts under treatment, and means for transmitting high frequency current through the tube to produce further heating of the glass and metal parts by the action of said high frequency current, said fluid serving to limit the temperature of said tube by the absorption of heat therefrom.

4. In apparatus for heating glass parts or the like, the combination comprising a burner including a metallic tube shaped to surround substantially said parts and adapted to carry a combustible fluid, an opening in said tube through which said fluid may be directed in burning condition against the glass part under treatment, and means for transmitting high frequency current through the tube and through the flame between said tube and said glass part to produce further heating thereof by the action of said high frequency current.

5. In apparatus for heating glass parts or the like, the combination comprising a burner including an annular metallic tube adapted to carry a combustible fluid, a pluraltiy of circumferentially spaced openings in said tube through which said fluid may be directed in burning condition against the glass part under treatment, and means for transmitting high frequency current through the tube to produce further heating of the glass part by the action of said high frequency current.

6. In apparatus for heating glass and metal parts to be sealed and having a substantially circular cross section, the combination comprising a burner including an annular metallic tube surrounding the parts and adapted to carry a combustible fluid, a plurality of orifices in said tube through which said fluid may be directed in burning condition against the glass and metal parts under treatment, and means for transmitting high frequency current through the tube to produce further heating of said parts by the action of said high frequency current.

7. In apparatus for joining and sealing glass and metal parts, the combination comprising a burner including an annular metallic tube adapted to carry a combustible gas and provided with a plurality of circumferentially spaced openings facing said parts through which said gas is directed in burning condition against the parts under treatment, and means for transmitting high frequency current through said tube to produce further heating of said parts by the action of said high frequency current.

8. In apparatus for heating glass parts or the like, the combination which comprises a burner including a metallic tube adapted to carry a combustible fluid and provided with annular means for directing a fluid in burning condition against the parts undergoing treatment, and means for passing high frequency current through the tube to produce further heating of the glass parts by the action of said high frequency current.

9. In apparatus for heating glass parts or the like, the combination which comprises a burner including a metallic tube adapted to carry a combustible gas and arranged to direct said gas annularly against the parts undergoing treatment, and means for passing high frequency current through the tube to produce further heating of the parts by the action of said high freqeuncy current.

10. Apparatus for heating glass parts or the like comprising means for directing a combustible gas against the parts undergoing heat treatment and means including a conductor substantially surrounding said parts for subjecting the parts to inductive high frequency heating to control the relative temperature of the parts.

11. Apparatus for sealing glass and metal parts comprising means for directing a combustible fluid in burning condition against the glass and metal parts, and means including an electrode adapted to be inductively coupled with the parts for subjecting the parts to high frequency inductive heating to control the relative temperatures of said parts.

OTIS W. PIKE.